United States Patent
Thompson, Jr. et al.

(10) Patent No.: US 6,717,104 B2
(45) Date of Patent: Apr. 6, 2004

(54) PROGRAMMABLE PHASE PLATE FOR TOOL MODIFICATION IN LASER MACHINING APPLICATIONS

(75) Inventors: Charles A. Thompson, Jr., Livermore, CA (US); Michael W. Kartz, Tracy, CA (US); James M. Brase, Livermore, CA (US); Deanna Pennington, Livermore, CA (US); Michael D. Perry, Poway, CA (US)

(73) Assignee: The Regents of the University of California, Oakland, CA (US)

( * ) Notice: Subject to any disclaimer, the term of this patent is extended or adjusted under 35 U.S.C. 154(b) by 99 days.

(21) Appl. No.: 10/172,458

(22) Filed: Jun. 13, 2002

(65) Prior Publication Data

US 2002/0190040 A1 Dec. 19, 2002

Related U.S. Application Data

(60) Provisional application No. 60/298,292, filed on Jun. 13, 2001.

(51) Int. Cl.[7] .............................................. B23K 26/06
(52) U.S. Cl. .............................. 219/121.73; 219/121.83
(58) Field of Search ........................ 219/121.6, 121.61, 219/121.62, 121.67, 121.68, 121.69, 121.72, 121.73, 121.74, 121.83, 121.84

(56) References Cited

U.S. PATENT DOCUMENTS

| | | | |
|---|---|---|---|
| 4,309,602 A | 1/1982 | Gonsalves et al. | |
| 5,042,950 A | 8/1991 | Salmon, Jr. | |
| 6,107,617 A | 8/2000 | Love et al. | |
| 6,150,629 A | * 11/2000 | Sievers | ................. 219/121.62 |
| 6,625,181 B1 | * 9/2003 | Oshemkov et al. | ............ 372/9 |

* cited by examiner

Primary Examiner—Samuel M. Heinrich
(74) Attorney, Agent, or Firm—James S Tak; Alan H. Thompson; Eddie E. Scott

(57) ABSTRACT

A system for laser machining includes a laser source for propagating a laser beam toward a target location, and a spatial light modulator having individual controllable elements capable of modifying a phase profile of the laser beam to produce a corresponding irradiance pattern on the target location. The system also includes a controller operably connected to the spatial light modulator for controlling the individual controllable elements. By controlling the individual controllable elements, the phase profile of the laser beam may be modified into a desired phase profile so as to produce a corresponding desired irradiance pattern on the target location capable of performing a machining operation on the target location.

24 Claims, 3 Drawing Sheets

PROGRAMMABLE PHASE PLATE FOR TOOL MODIFICATION IN LASER MACHINING APPLICATIONS

CLAIM OF PRIORITY IN PROVISIONAL APPLICATION

This application claims priority in provisional application filed on Jun. 13, 2001, entitled "A Programmable Phase Plate for Tool Modification in Laser Machining Applications," U.S. serial No. 60/298,292.

The United States Government has rights in this invention pursuant to Contract No. W-7405-ENG-48 between the United States Department of Energy and the University of California for the operation of Lawrence Livermore National Laboratory.

FIELD OF THE INVENTION

The present invention relates to laser machining. More particularly, the present invention relates to a laser machining system and method utilizing a spatial light modulator as a programmable phase plate to modify the phase profile of a laser beam tool and thereby control a corresponding laser beam irradiance pattern produced on a target location for performing a desired machining operation on the target location.

BACKGROUND OF THE INVENTION

In laser based machining applications, such as the cutting, drilling, etc. of metals or other materials, the laser beam is typically focused onto the material to be machined. Fixed phase plates are known and have been proposed as a means of modifying the shape and irradiance distribution of the laser beam to improve cutting efficiency. When placed at a chosen plane within a laser system, a fixed phase plate serves to modify the beam's phase profile at that plane. However, when propagated to a machine tool location, e.g., the focal plane, the beam's phase profile is changed along with a corresponding irradiance pattern produced at the machine tool location. In this manner of modifying only the phase, and not the intensity, the efficiency of the system may be preserved. Unfortunately, however, fixed phase plates are expensive to fabricate and are known to have long lead times for production. Moreover, new fixed phase plates are necessary every time the laser beam irradiance requires modification to a new size or shape.

SUMMARY OF THE INVENTION

One aspect of the invention includes a system for laser machining comprising: a laser source for propagating a laser beam toward a target location; a spatial light modulator having individual controllable elements capable of modifying a phase profile of the laser beam and producing a corresponding irradiance pattern on the target location; and a controller operably connected to the spatial light modulator for controlling the individual controllable elements so as to modify the phase profile of the laser beam into a desired phase profile and thereby produce a corresponding desired irradiance pattern on the target location capable of performing a machining operation thereon.

Another aspect of the invention includes a method for laser machining comprising: propagating a laser beam from a laser source toward a target location, the laser beam having a phase profile producing a corresponding irradiance pattern on the target location; controlling individual controllable elements of a spatial light modulator to modify the phase profile of the laser beam into a desired phase profile and thereby produce a desired irradiance pattern on the target location capable of performing a machining operation thereon; and machining the target location using the desired irradiance pattern.

BRIEF DESCRIPTION OF THE DRAWINGS

The accompanying drawings, which are incorporated into and form a part of the disclosure, are as follows.

DETAILED DESCRIPTION

The present invention provides computer-controlled modification of a laser irradiance pattern, i.e., a laser beam spot, produced on an article or location for machining and materials processing applications, e.g., drilling and cutting. The use of a spatial light modulator as a programmable phase plate allows for the modification of the laser irradiance pattern without attenuation of the beam with some form of appodizer. This is achieved by controlling the spatial light modulator to modify a phase profile of the laser beam such that when the laser beam is propagated onto a target article or location (hereinafter "target location"), the irradiance pattern of the beam spot produced on the target location is in turn modified into a desired pattern. In this manner, the size, shape and intensity distribution of the irradiance pattern may be tailored to perform a particular desired machining operation on the target location. It is notable, that while laser drilling is one preferred machining operation, other types of machining and materials processing operations may also be performed by the laser machining system including but not limited to turning, planing, milling, or otherwise reducing, shaping, or finishing.

Figure 1:
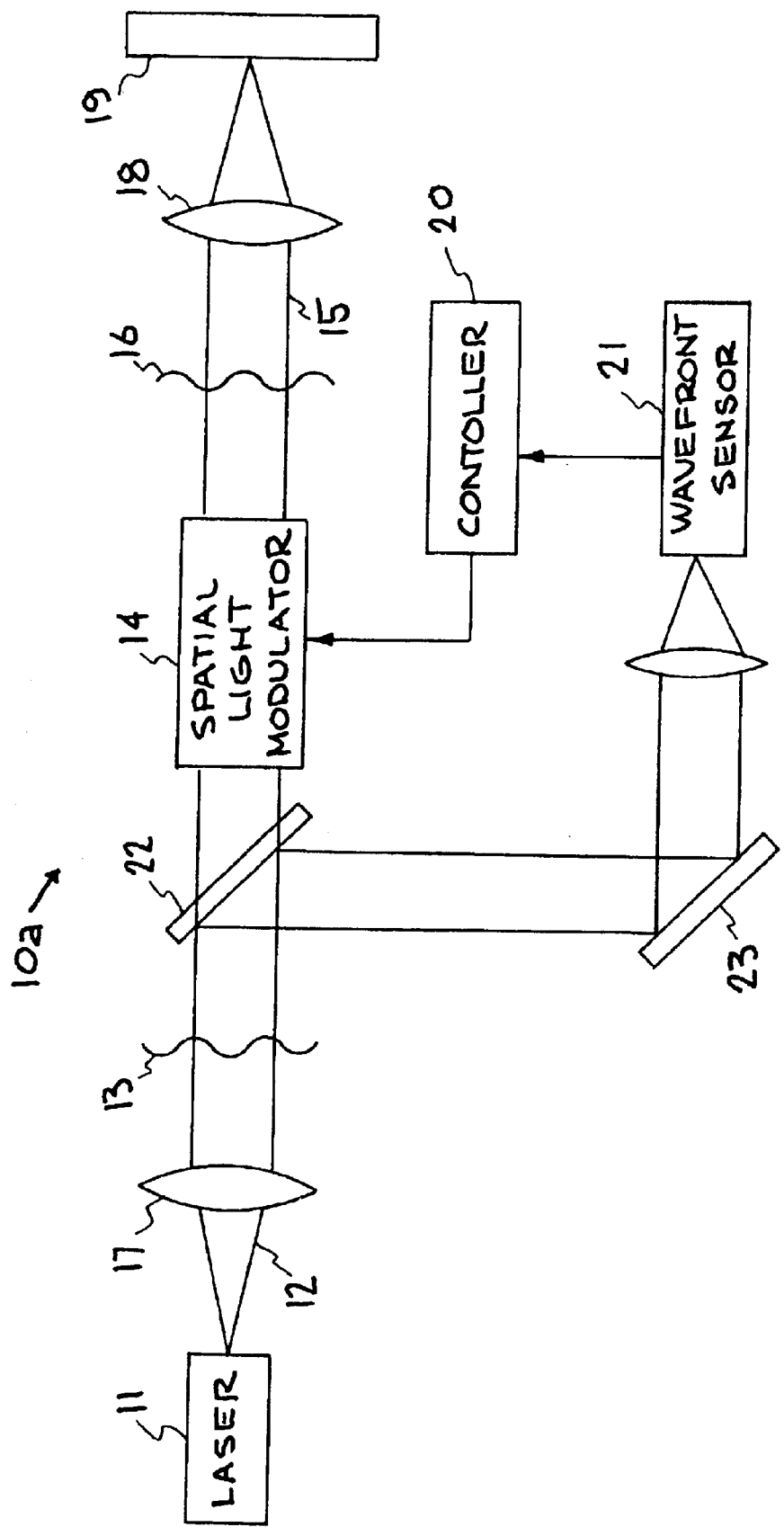
FIG. 1 is a schematic view of the system for laser machining, shown with a first exemplary closed loop control arrangement.
Figure 2:
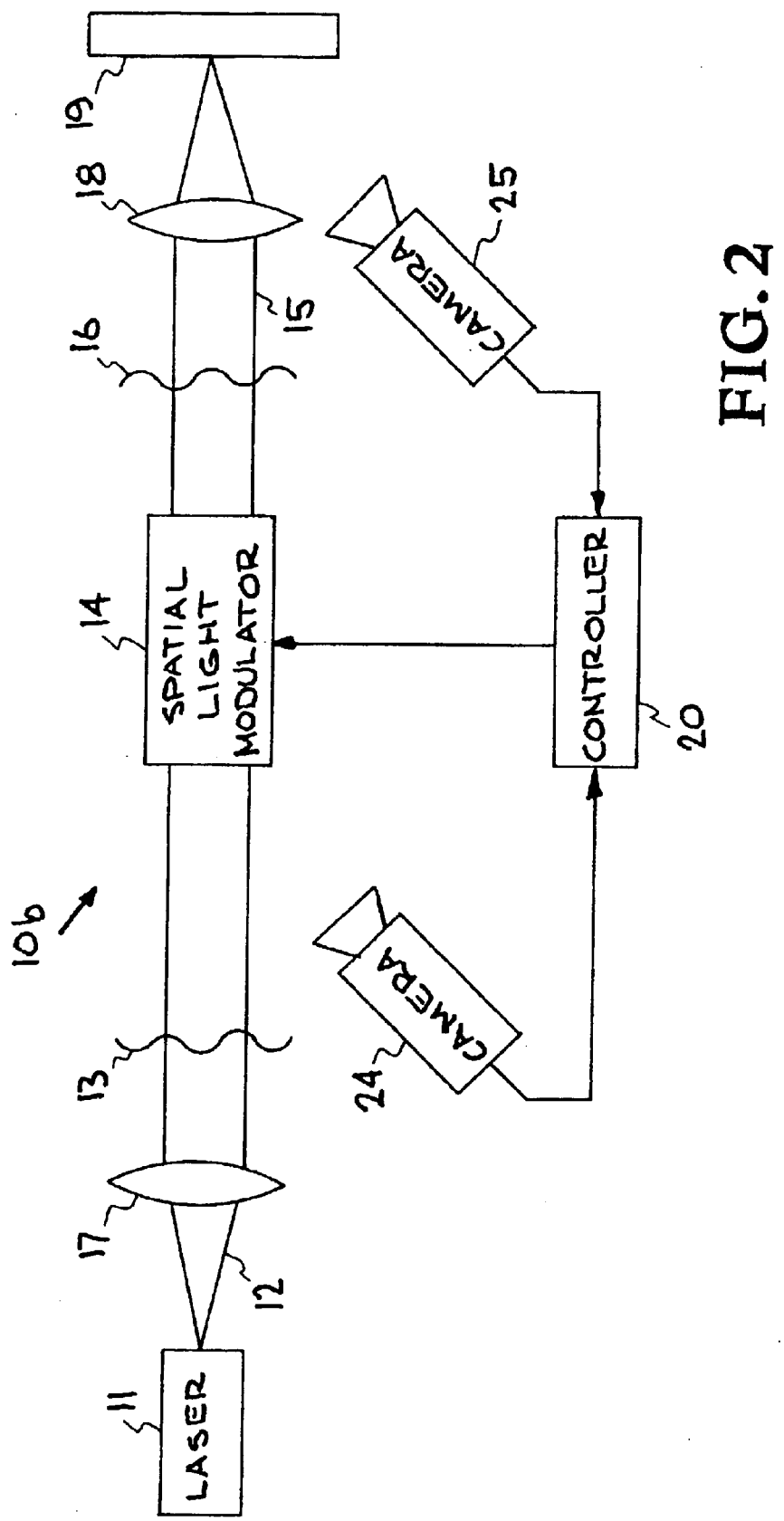
FIG. 2 is a schematic view of the system for laser machining, shown with a second exemplary closed loop control arrangement.

Turning now to the drawings, FIG. 1 shows a first exemplary embodiment of the laser machining system of the present invention, generally indicated at reference character 10*a*, and FIG. 2 shows a second exemplary embodiment of the laser machining system, generally indicated at reference character 10*b*. Common to both exemplary embodiments 10*a* and 10*b* of the laser machining system are three components: a laser source 11 for producing a laser beam 12, a spatial light modulator 14 (hereinafter "SLM") such as a liquid crystal SLM or "LC SLM," and a controller such as a computer processor 20 which controls the operation of the system and in particular the SLM. The laser source 11 is preferably a high power laser source. Short pulse lasers are one type of exemplary laser capable of being used with the present invention. However, other types of laser systems may also be utilized for the present invention, such as high repetition rate laser systems which can take advantage of the high-speed wavefront phase modulation capability of MEMs SLMs in particular.

Various types of SLMs may be utilized for purposes of the present invention, including but not limited to liquid crystal, MEMs (micro-electromechanical systems), or otherwise. The SLM 14 component has individual controllable elements each individually contributing to effect phase profile modification of the laser beam. In particular, phase profile modification by the SLM may occur by passing the laser beam through the individual controllable elements. Or in the alternative, phase profile modification may take place upon reflecting the laser beam from the individual controllable elements (see FIG. 4). In either case, the SLM is optically positioned between the laser source 20 and the target location 19. A manner of effecting phase changes will be determined by the type of SLM selected and the structure and method of operating the SLM to control the individual controllable elements. For example, LC SLMs may be either electrically or optically addressed, by means of individual pixels capable of being individually controlled to modify the phase profile, e.g. wavefront shaping and correction. MEMs SLMs are also known, such as the reflective SLM shown at reference character 30 in FIG. 4. These types of SLMs are typically individual micro-deformable mirrors 31 with either segmented or continuous surfaces. In these types of SLMs, each individual deformable mirror 31 may be actuated, such as by electrostatic actuation. Actuation of the individual mirror elements serves to modify the phase across a two-dimensional array of pixels. It is appreciated that while LC SLM and MEMs type SLM technologies have been commonly used, the present invention is not limited only to such. Other types of spatial light modulators serving to perform the same or similar function of laser beam phase profile modification may be alternatively utilized.

As shown in the drawings, the controller is, for example, a computer processor 20 operably connected to the SLM, such as by electrical connection. The computer processor 20 and the SLM are considered "operably connected" because the SLM is controlled and operated by the controller. In particular, the computer processor serves to operably control the SLM's individual controllable elements such that the phase profile of the post-modulated laser beam (15 in FIGS. 1 and 2; 34 in FIG. 4) is modified into a desired phase profile 16. Additionally, the controller may be configured to receive a desired laser irradiance pattern input from a user, to thereby deterministically control the SLM.

Figure 4:
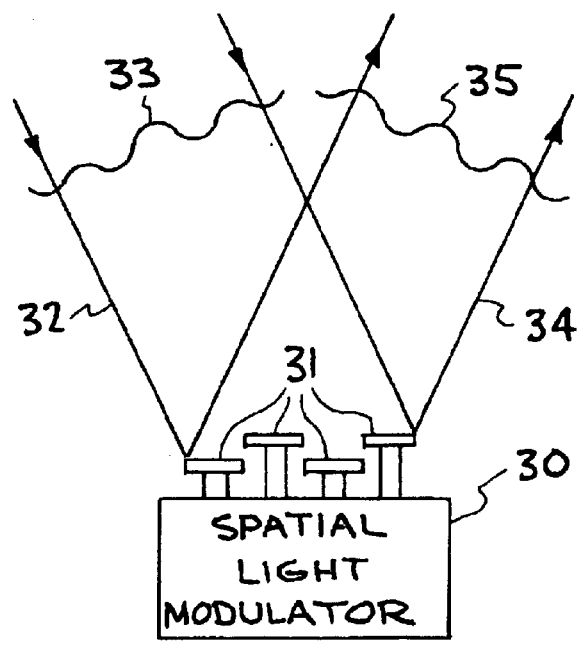
FIG. 4 is a schematic view of a MEMs-type SLM effecting phase modification by reflection.

The laser source 11, the SLM 14, and the computer processor 20, together operate to modify a phase profile 13 of the laser beam 12 and thereby shape and control a corresponding irradiance pattern produced on a target location 19. In operation, the laser source 11 propagates the laser beam 12 to the target location 19 by way of the SLM 14 optically interposed therebetween. As shown in FIGS. 1 and 2, the laser beam 12 produced by the laser source 11 passes first though a first lens 17 (or set of lenses) and then through the SLM 14 where the phase profile is modified into a desired phase profile 16. The first lens may be, for example, a collimating lens or a set of lenses specifically to match beam size to SLM active area. Subsequent to phase profile modification, the laser beam 15 is then focused by a second lens 18 toward the target location 19. At the target location 19, a corresponding irradiance pattern, i.e., beam spot, is produced on the target location which is capable of performing a machining operation. It is appreciated that the propagation of a laser beam "towards" a target location does not imply a linear optic path to the target location, rather that the beam spot is ultimately produced on the target location. Furthermore, and in contrast to the pass-through modification of phase shown in FIGS. 1 and 2, FIG. 4 illustrates phase profile modification for a reflection SLM 30. In FIG. 4, a pre-modulation laser beam 32 is shown having a phase profile 33 and striking the reflective surface of the SLM 30 and the individually actuable mirror elements 31 at an angle. And a post-modulation laser beam 34 is shown reflected from the SLM 30, ideally having a desired phase profile 35.

In order to produce a desired irradiance pattern on the target location for machining, a desired irradiance pattern input may be submitted by a user into the computer processor 20. An example of a desired irradiance pattern is shown at reference character 27 in FIG. 3B. Once inputted, the computer processor determines the necessary phase profile to propagate a laser beam from a first point in the system (the phase plate) to a second point, the machining area (see FIG. 1). This is accomplished typically by means of a computer program installed on the computer processor and developed for such calculations. Once the phase profile associated with the desired irradiance pattern has been determined it is written via the computer to the SLM. The input of the desired irradiance pattern serves to program the SLM with the necessary instructions to control each individual control element of the SLM accordingly, and thereby effect the necessary phase changes to the laser beam. In this manner, the present invention enables modification of the laser beam irradiance pattern required for laser machining without the need for creating new, fixed phase plates. It is notable that the SLM may be programmed with a fixed irradiance pattern, or programmed with an open loop set of SLM control instructions for producing the desired irradiance pattern. Closed loop control is also contemplated by various monitoring methods (see discussion below).

In any case, the submitted desired irradiance pattern input deterministically controls the SLM and the machining operation, i.e., the pattern input controls and drives the SLM's individual controllable elements, and also determines the type of machining as well as the outcome of the resulting drilling, cutting or otherwise machining. It is also notable that while the laser beam is typically focused onto the material to be machined in laser based machining applications, this need not be the case. Laser machining can take place near or off focus as well, i.e., removed from the focal plane, and the SLM programmed with an appropriate phase profile to make it so. The present invention modifies the phase profile to determine what the irradiance pattern is to be at the focal or near focal plane where machining takes place. In particular, the size, shape and/or energy (intensity) distribution of the irradiance pattern may be modified to effect the particular type of machining operation to be performed on the target location.

Figure 3A:
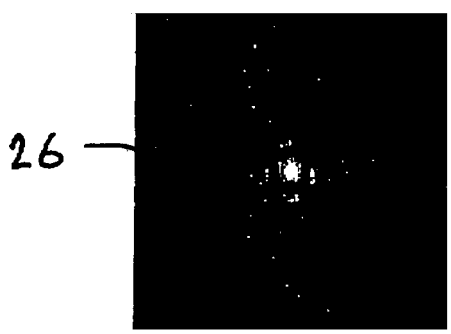
FIG. 3A illustrates an image of a diffraction limited farfield spot without phase modification according to the present invention.
Figure 3B:
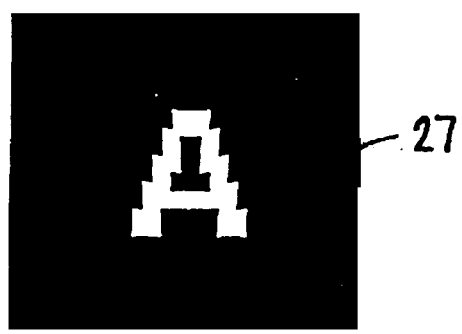
FIG. 3B illustrates an exemplary desired irradiance pattern in the shape of the letter "A".
Figure 3C:
FIG. 3C illustrates an image of the calculated phase pattern to achieve the desired irradiance pattern in FIG. 3B.
Figure 3D:
FIG. 3D illustrates the actual measured farfield spot produced by the calculated phase pattern of FIG. 3C.

As an illustrative example, FIGS. 3A–D show four images 26–29 illustrating irradiance pattern formation for an exemplary "A" shaped irradiance pattern. First, in FIG. 3A, an image of a diffraction limited farfield spot is shown at reference character 26 without phase profile modification. The diffraction limited spot 26 is what the focus of a laser beam might look like if there were no optical aberrations in the system. The picture depicts an actual measured farfield spot for a rectangular laser beam. Reference character 27 in FIG. 3B is an image illustrating an example of the desired irradiance pattern or farfield spot, i.e., the letter "A". Reference character 28 in FIG. 3C is an image of the calculated phase pattern to achieve the desired irradiance pattern. After applying the wavefront shown in image 28, the farfield spot was transformed to the actual measured farfield spot in the SLM system, shown in image 29 of FIG. 3D. The desired irradiance patterns and associated beam spots can be any pattern, including symbols, letters, numbers, and known shapes and images.

Ideally, the "tool" irradiance pattern matches the desired irradiance pattern. If not, a variety of control strategies can be implemented to improve the performance of the system.

In one embodiment illustrated in FIG. 1, the actual beam phase is measured with a wavefront sensor 21 in a closed loop adaptive optics (AO) control system. Such a control system adjusts the SLM 14 to correct for the aberration and have the measured phase match the desired to improve beam quality. This particular strategy measures and compensates for optical (e.g., high-spatial-frequency) aberrations in the system often caused by heating in a high-power laser system, and comprises an adaptive optics system. If measurements and corrections are applied at a rate corresponding to optical system fluctuations (i.e., turbulence), a closed loop, real time controller is possible. FIG. 1 illustrates one exemplary closed loop control arrangement utilizing a wavefront sensor. The laser machining system 10a includes a pair of beam splitting optics 22, 23 to split a portion of the laser beam 12 out to a wavefront sensor 21, such as a Shack-Harmann sensor, at a conjugate plane. It is notable that various types of wavefront sensors may be utilized, including but not limited to Shack-Hartmann sensors, interferometers, phase diversity sensors, etc. It is further notable that the Shack Hartman wavefront sensor can be placed to detect the phase of the laser beam either upstream or downstream of the SLM (pre or post modulation). Basically, the closed loop high-resolution correction of laser beam phase aberration helps in developing a more accurate irradiance pattern.

Alternatively, the measured irradiance (intensity) patterns are used to solve for system phase profile using phase diversity or phase retrieval algorithms in a closed-loop spot shape control system. Such a system operates by detecting the irradiance distribution at two locations separated by a well known (characterized) optical system. The algorithms operate by simulating optical propagation in the computer and iteratively converging on determining the phase front necessary to achieve the irradiance distribution at both planes. This approach uses cameras to effect adaptive beam control. Cameras can be placed into the system to monitor the effects of the SLM modifications on the tool irradiance patterns. As can be seen in FIG. 2, a first exemplary arrangement has a first camera 24 monitoring the irradiance pattern on the SLM and a second camera 25 monitoring the irradiance pattern produced on the target location. It is appreciated, however, that other arrangements for camera placement may be implemented to perform the same or similar function. Intensity information from each of the cameras 24, 25 are then sent to the computer processor 20 for controlling the SLM to effect the necessary phase corrections to improve upon the desired irradiance pattern.

While particular operational sequences, parameters, and particular embodiments have been described and or illustrated, such are not intended to be limiting. Modifications and changes may become apparent to those skilled in the art, and it is intended that the invention be limited only by the scope of the appended claims.

We claim:

1. A system for laser machining comprising:
   a laser source for propagating a laser beam toward a target location;
   a spatial light modulator having individual controllable elements capable of modifying a phase profile of the laser beam to produce a corresponding irradiance pattern on the target location; and
   a controller operably connected to the spatial light modulator for controlling the individual controllable elements so as to modify the phase profile of the, laser beam into a desired phase profile and thereby produce a corresponding desired irradiance pattern on the target location capable of performing a machining operation thereon.

2. The system as in claim 1, wherein the spatial light modulator is a liquid crystal spatial light modulator.

3. The system as in claim 1, wherein the spatial light modulator is configured to modify the phase profile of a laser beam passing through the individual controllable elements.

4. The system as in claim 1, wherein the spatial light modulator is configured to modify the phase profile of a laser beam reflected from the individual controllable elements.

5. The system as in claim 4, wherein the spatial light modulator is a deformable mirror comprising individually actuable mirror elements.

6. The system as in claim 1, wherein the controller is a computer processor.

7. The system as in claim 6, wherein the computer processor is capable of receiving a desired irradiance pattern input for determinatively controlling the spatial light modulator.

8. The system as in claim 1, further comprising a wavefront sensor capable of detecting wavefront phase aberrations of the laser beam and sending wavefront phase aberration information to the controller to thereby control the individual controllable elements to correct the wavefront phase aberrations.

9. The system as in claim 8, wherein the wavefront sensor conveys wavefront phase aberration information to the controller in a closed loop system to correct the wavefront phase aberrations in real time.

10. The system as in claim 8, wherein the wavefront sensor is a Shack-Hartman type wavefront sensor.

11. The system as in claim 1, further comprising first means for measuring intensity of the laser beam prior to modification by the spatial light modulator and second means for measuring intensity of the laser beam subsequent to modification by the spatial light modulator, said first and second means sending the respective intensity informations to the controller to thereby correct wavefront phase aberrations.

12. The system as in claim 11, wherein the first and second means for measuring intensity of the laser beam send intensity informations to the controller in a closed loop system to correct the wavefront phase aberrations in real time.

13. A method for laser machining comprising:
   propagating a laser beam from a laser source toward a target location, the laser beam having a phase profile producing a corresponding irradiance pattern on the target location;
   controlling individual controllable elements of a spatial light modulator to modify the phase profile of the laser beam into a desired phase profile and thereby produce a desired irradiance pattern on the target location capable of performing a machining operation thereon; and machining the target location using the desired irradiance pattern.

14. The method as in claim 12, wherein the spatial light modulator is a liquid crystal spatial light modulator.

15. The method as in claim 12, wherein the spatial light modulator is capable of modifying the phase profile of a laser beam passing through the individual controllable elements.

16. The method as in claim 12, wherein the spatial light modulator is capable of modifying the phase profile of a laser beam reflected from the individual controllable elements.

17. The method as in claim 16, wherein the spatial light modulator is a deformable mirror comprising individually actuable mirror elements.

18. The method as in claim 12, wherein the controller is a computer processor.

19. The method as in claim 12, further comprising receiving a desired irradiance pattern input into the computer processor for determinatively controlling the spatial light modulator to produce the desired phase profile and the associated desired irradiance pattern.

20. The method as in claim 12, further comprising detecting wavefront phase aberrations of the laser beam and sending wavefront phase aberration information to the controller to thereby control the individual controllable elements so as to correct the wavefront phase aberrations.

21. The method as in claim 20, wherein the detecting of wavefront phase aberrations and the sending of wavefront phase aberration information to the controller operates to correct the wavefront phase aberrations in real time in a closed loop system.

22. The method as in claim 20, wherein the wavefront sensor is a Shack-Hartman type wavefront sensor.

23. The method as in claim 12, further comprising measuring a first intensity of the laser beam prior to modification by the spatial light modulator, measuring a second intensity of the laser beam subsequent to modification by the spatial light modulator, and sending the first and second intensity information to the controller to modify the desired phase profile and the desired irradiance pattern.

24. The method as in claim 23, wherein the first and second intensity information is sent to the controller in a closed loop system to correct the wavefront phase aberrations in real time.

* * * * *